3,470,199
PRODUCTION OF POLYAMIDE MOLDINGS
Hans Jung, Ludwigshafen (Rhine), Germany, assignor to Badische Anilin- & Soda-Fabrik Aktiengesellschaft, Ludwigshafen (Rhine), Germany
Filed Oct. 6, 1965, Ser. No. 493,347
Claims priority, application Germany, Oct. 13, 1964, B 78,894
Int. Cl. B29c 5/04, 9/00
U.S. Cl. 264—310         3 Claims

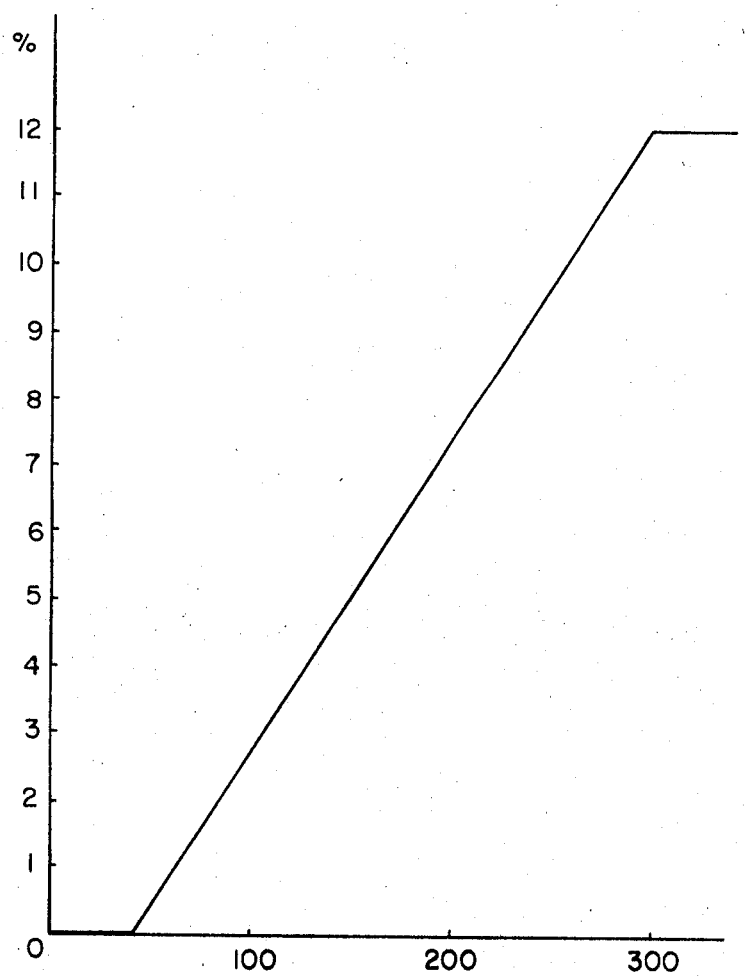

ABSTRACT OF THE DISCLOSURE

A process for producing cast articles in which a mixture of at least two lactams is passed into a rotating mold whereupon polymerization takes place in the presence of alkaline catalysts and activators, and wherein the concentration of the separate lactam feed is varied during the polymerization process.

---

This invention relates to a process for the production of copolyamide moldings by activated anionic polymerization of lactams in which the concentration of the lactam components in the lactam mixture being supplied to the polymerization is varied.

It is known that polyamide moldings may be prepared by centrifugal casting by introducing polymerization mixtures of lactams having seven or more ring members, activators and catalysts, containing conventional additives if desired, into rotating molds whose speed of rotation is equivalent to a centrifugal acceleration greater than the acceleration due to gravity ($g$). The lactams are polymerized in these rotating molds at temperatures between their melting points and those of the polyamides so that the desired molding is formed. It is furthermore known that the said polymerization may be carried out in rotating molds whose rotational speed is equivalent to a centrifugal acceleration which is less than the acceleration due to gravity. This method is known as rotational molding. Moldings prepared by means of this method from polycaprolactam, for example rollers, are not always free from internal stresses which may result in the rollers cracking if they are machined or exposed to uneven loading. If mixtures of lactams, for example mixtures of caprolactam and capryllactam, are used for the polymerization, rollers are obtained which are softer and have less internal stress, but they have too low compressive strength for practical use.

I have now found that copolyamide moldings can be prepared by polymerization of a molten mixture of at least two lactams having at least seven ring members in the presence of an alkaline catalyst, an activator and if desired one or more conventional additives in a heated rotating mold by varying the concentration of the components in the lactam mixture supplied to the polymerization.

Moldings are obtained having varying hardness and crystallinity throughout whose internal stresses are so slight that cracks do not occur either upon machining the molding or upon uneven loading during use. Moreover, it is possible to make moldings having a different surface hardness. Thus for example, if the mold be charged at the beginning of the polymerization with a mixture of capryllactam, activator and catalyst and some of the capryllactam in the mixture being supplied be replaced gradually by caprolactam so that at the end the only lactam contained in the melt supplied is caprolactam, moldings, for example rollers, are obtained having a soft surface and a hard core. Conversely rollers having high surface hardness can be made by beginning with caprolactam and ending with capryllactam. Surfaces of intermediate hardness can be obtained by varying the concentration of the lactams in an appropriate way, for example by first using a polymerization mixture containing as lactam about 20% of component A (for example caprolactam) and about 80% of component B (for example capryllactam) and changing the concentration during the polymerization so that part of one component is gradually replaced by the other component. Further possibilities of variation are available when more than two lactams are used.

It is surprising that the differences in concentration of the lactams in the melt in the process according to this invention are not equalized by the rotary movement.

Polymerization is carried out under the conventional conditions for centrifugal casting or rotational molding.

Heated molds which have rotation symmetry about at least one axis are suitable as the rotatable molds. It is advantageous to heat the molds to temperatures of from 80° to 200° C. prior to the introduction of the polymerization mixture.

The rotational speed of the mold in centrifugal casting is advantageously such that, depending on the diameter of the mold, an acceleration is achieved which is one to one hundred times the acceleration due to gravity. In the case of rotational molding, the rotational speed also depends on the size of the mold and is chosen so that the centrifugal acceleration of the molten polymerization mixture is less than the acceleration due to gravity.

Examples of lactams having seven to 13 ring members which may be processed in accordance with this invention are caprolactam, enantholactam, capryllactam, capric lactam, laurolactam or C-substituted derivatives of these lactams such as 3-methylcaprolactam and 4-isopropylcaprolactam. The lactams may also contain lactams which are combined with each other by bridging groups, for example methylene-bis-caprolactam.

Conventional polymerization catalysts may be used, for example alkaline reacting substances such as metals of main Groups I and II of the Periodic System of Elements, for example sodium, potassium, lithium; the hydrides, oxides, hydroxides and amides of these metals; sodium or potassium compounds of alcohols, for example of methanol, ethanol, butanol, lauryl alcohol, cetyl alcohol, stearyl alcohol, and Grignard reagents. Reaction products of lactams with alkali or alkaline earth metals and their alkaline reacting compounds, such as are described in British patent specification No. 868,808, are particularly suitable. The catalysts are added and uniformly distributed in the lactam melts in amounts of 0.01 to 5% by weight, preferably 0.1 to 2% by weight (with reference to the total weight of lactams used) prior to introduction into the rotatable molds.

Examples of suitable activators are derivatives of inorganic and organic acids, such as halides, anhydrides, esters and nitriles, for example acetyl chloride, benzoyl bromide, terephthaloyl chloride, phthalic anhydride, succinic anhydride, triphenyl phosphate or butyl stearate, and also isocyanates and carbodiimides. The following are particularly suitable: urea derivatives, such as pyrrolidone-N-(carboxylic acid)-hexamethylene diamide-1,6-triphenylmethane - 4,4',4''-triscarbamido-caprolactam; N-substituted carbamic esters, such as ethyl N-phenylcarbamate, and also bisisoalkylurethanes, such as N,N'-hexamethylene-1,6-isopropylurethane. The activators are added in the known amounts of from 0.05 to 10% by weight, preferably 0.4 to 5% by weight, with reference to the whole of the amount of lactam used for the polymerization.

The polymerization mixture is advantageously prepared (by a method to which no claim is made in the present application) by adding the catalyst to a lactam melt and then adding one or more of the said activators and effecting uniform distribution thereof in the melt prior to pouring or injecting the melt into rotatable molds. It is also possible to add catalyst to one portion of the lactam melt and activator to the other portion of the lactam melt and to mix the two portions of the melt, for example through mixing nozzles, during introduction thereof into a rotatable mold. If a four-component nozzle be chosen for a polymerization of two components A and B, (1) component A+ activator
(2) component A+ catalyst
(3) component B+ activator, and
(4) component B+ catalyst may be passed through the individual passages of the four-component nozzle.

Conventional additives, such as reinforcement materials, fillers, lubricants, dulling agents and stabilizers, may be used, but no claim is made to this step per se. Examples of fillers are inorganic and organic substances such as metal powder, for example aluminum or copper powder, quartz powder, ground shale, sand, diatomaceous earth, polyamide and other plastics; examples of reinforcement materials are glass staple fibers, glass fiber fleece or glass fabric and other fibers and fabrics. Dulling agents are for example titanium dioxide and zinc oxide. Examples of suitable lubricants are graphite, lead powder and molybdenum disulfide.

Particularly thick-walled moldings, for example rollers which may be used for example as calender rolls, may be made by the new process.

The invention is illustrated by the following example. The parts indicated in the example are parts by weight.

EXAMPLE

A cylindrical mold having a length of 2000 mm. and a diameter of 500 mm. is heated to 150° C. and rotated at 600 r.p.m. about the cylindrical axis. The total charge to be fed into the mold (consisting of 300 parts of monomer melt which contains, in addition to the monomers, 0.6 part of sodium caprolactamate and 12 parts of biscaprolactam-N-hexamethylene-diamide-1,6) is introduced at a temperature of 125° C. into the mold in the manner indicated in the accompanying drawing which is a graph indicating as the ordinates the percentage concentration of one of the monomers (capryllactam) in the mixture of the two lactams (capryllactam and caprolactam) and as the abscissae the number of parts of the total charge which have been introduced into the mold.

The total time taken for introducing the charge is four minutes. The temperature in the polymerizing mixture rises to 180° C. The mold and its contents are allowed to cool slowly and a polyamide roller is obtained which has a hard surface and a soft core. The roller shows no tendency to crack when machined or when used in a calender.

I claim:

1. A process for the production of polyamide moldings which comprises: passing a molten mixture of at least two lactams having 7 to 13 ring members into a rotating and heated mold, polymerizing the mixture within said mold in the presence of alkaline catalysts and activators and gradually changing the concentration of the lactams in the mixture being passed into said mold.

2. A process as claimed 1 wherein a mixture of capryllactam, catalyst and activator is supplied to the rotating mold and the capryllactam is gradually replaced by caprolactam in the charge being supplied to the mold so that at the end of the introduction the only lactam supplied is caprolactam.

3. A process as claimed in claim 1 wherein a mixture of caprolactam, activator and catalyst is supplied to the rotating mold at the start and the caprolactam is gradually replaced by capryllactam so that at the end of the introduction the only lactam being supplied is capryllactam.

References Cited

UNITED STATES PATENTS

| 2,454,847 | 11/1948 | Slack | 264—311 |
| 2,887,728 | 5/1959 | Usab | 264—311 |
| 2,930,097 | 3/1960 | Iversen | 264—255 |
| 3,228,759 | 1/1966 | Small. | |
| 3,275,733 | 9/1966 | Schule | 264—310 |

FOREIGN PATENTS

| 1,176,037 | 4/1959 | France. |
| 156,057 | 10/1932 | Switzerland. |

ROBERT F. WHITE, Primary Examiner
S. I. LANDSMAN, Assistant Examiner

U.S. Cl. X.R.
264—245, 311